United States Patent Office 3,050,501
Patented Aug. 21, 1962

3,050,501
SILYLPROPYL SILYLBUTANOATES
Leo H. Sommer, State College, Pa., assignor to Dow Corning Corporation, Midland, Mich., a corporation of Michigan
No Drawing. Filed May 6, 1957, Ser. No. 657,023
6 Claims. (Cl. 260—46.5)

The present invention relates to silylpropyl silylbutanoates in monomeric, polymeric, or copolymeric form, and which are characterized by the structure $$\equiv Si(CH_2)_3CO(CH_2)_3Si\equiv$$
$$\parallel$$
$$O$$

as explained in detail below.

This invention is specifically concerned with novel organosilicon compounds selected from the group consisting of (1) monomeric silanes having the formula $$R_xY_{3-x}Si(CH_2)_3CO(CH_2)_3SiR_xY_{3-x}$$
$$\parallel$$
$$O$$

where R is a monovalent hydrocarbon radical free of aliphatic unsaturation, Y is selected from the group consisting of Cl, Br, and alkoxy radicals, and $x$ is an integer of from 0 to 2 inclusive, and (2) siloxanes containing polymeric units of the formula $$O_{\frac{3-x}{2}}R_xSi(CH_2)_3CO(CH_2)_3SiR_xO_{\frac{3-x}{2}}$$
$$\parallel$$
$$O$$

where R and $x$ are as above defined. It is preferred that the R radicals be methyl and/or phenyl radicals.

The monomers of the invention can be prepared by reacting allyl vinylacetate $$(CH_2=CHCH_2COOCH_2CH=CH_2)$$

with the corresponding hydrogenosilane $(R_xSiHY_{3-x})$. This reaction is conducted in the presence of platinum deposited on charcoal, hereafter designated as Pt/C, or chloroplatinic acid as the catalyst.

In the silane reactant, R can be any monovalent hydrocarbon radical free of aliphatic unsaturation. Examples of suitable radicals are: alkyl such as methyl, ethyl, and octadecyl; aryl such as phenyl and xenyl; cycloaliphatic such as cyclohexyl; alkaryl such as tolyl, and aralkyl such as benzyl. When more than one R radical is present on a particular silicon atom it can represent the same or different radicals. Y can be Cl, Br, or an alkoxy radical, and of the latter a radical of from 1 to 8 inclusive carbon atoms is preferred. The Y radicals can also be the same or different radicals. Examples of preferred silane reactants include $HSiCl_3$, $MeHSiCl_2$, $MeHSi(OEt)Cl$, $MePhHSi(OEt)$, $Ph_2HSi(OMe)$, $HSiBr_3$, $PhHSi(OBu)_2$, and $Me_2HSiCl$. The symbols Me, Et, Bu, and Ph are used above and throughout this specification to represent methyl, ethyl, butyl and phenyl radicals respectively. These silane reactants are well known materials, many of which are commercially available. In general the chlorosilane reactants are preferred because of lower cost and greater availability. The alkoxy substituted products of this invention can alternatively be prepared by reacting the chlorosilane type of products with the corresponding alcohol, whereby the conventional alcoholysis of the chlorosilane takes place.

It has been noted above that when more than one R radical is present on a particular silicon atom, the radicals can be the same or different. It is preferred that the type and number of R radicals present on the first silicon atom in the monomer be the same as on the second silicon atom. This is accomplished by the simple expedient of having only one $R_xSiHY_{3-x}$ type compound present during the addition reaction, so that the same organosilyl group is added to both of the double bonds in the olefinic reactant. If desired, however, a mixture of silane reactants can be used. In the latter case, at least a portion of the monomeric product will have two differently substituted silicon atoms present. In either case, it is best to employ the reactants in a ratio of at least two moles of total silane reactant per mole of olefin. An alternative process for the preparation of those monomers in which differently substituted silicon atoms are present is to use a ratio of only one mole of a single silane per mole of olefin in the initial reaction, followed by the addition at least one mole per mole olefin of a different silane reactant.

The optimum reaction temperature for the addition reaction varies with the type and amount of catalyst present as well as with the particular reactants chosen. The Pt/C catalysts are known materials, and for the reaction in question those which contain from about 2 to 5 percent by weight of platinum should be employed. The catalyst mass is itself then preferably used in an amount of from about 2 to 6 percent by weight based on the weight of the olefin reactant. Reaction temperatures of from about 80° to 150° C. are generally suitable. Lower temperatures and/or less platinum can be used when chloroplatinic acid is used as the catalyst. The latter is preferably used in its commercial form, which is as the hexahydrate $H_2PtCl_6 \cdot 6H_2O$. Amounts in the region of from $1\times10^{-4}$ to $1\times10^{-7}$ mole per mole of the olefin are generally sufficient, and the handling of such amounts is facilitated by the use of a solution of the acid in an appropriate solvent (e.g. in an alcohol such as isopropanol or a glycol ether such as the dimethylether of diethylene glycol). Excesses of either catalyst can be present with no particular harm to the system, but are of course undesirable from the economical standpoint.

The monomeric silanes produced in the above-described manner are hydrolyzed by contacting them with water, using any of the usual halosilane or alkoxysilane hydrolysis techniques. If a single monomer of this type is employed, the product is a homopolymer. If two or more of such monomers are cohydrolyzed, the product is a copolymer. In either case, the resulting siloxane consists essentially of units of the formula $$O_{\frac{3-x}{2}}R_xSi(CH_2)_3CO(CH_2)_3SiR_xO_{\frac{3-x}{2}}$$
$$\parallel$$
$$O$$

where R and $x$ are as above defined. In general, such polymers tend to be resinous when $x$ has an average value of from 0 up to about 0.9, then of a rubbery or viscous fluid nature up to an average value of about 1.1, then of a decreasingly viscous fluid nature as the value rises to 2.

A second type of copolymer within the scope of this invention is that which contains both polymeric units of the above type and units of the formula $$R'_bSiO_{\frac{4-b}{2}}$$

preferably there being at least 0.1 molar percent of the former units present. In the latter units, R' represents monovalent hydrocarbon radicals or halogenated monovalent hydrocarbon radicals and $b$ is an integer of from 0 to 3 inclusive. Although $b$ can be 0 in some of the individual units, its average value when considering all of such units present in the copolymer should be from 0.8 to 3 inclusive. Thus the latter units will be of the type $R'SiO_{1.5}$, $R'_2SiO$, and $R'_3SiO_{.5}$, and include $SiO_2$ units to the extent that the average number of R' radicals is maintained up to at least 0.8 per Si atom in the polymeric units in question. The R' radicals can be the same or different radicals within any particular unit or within the whole copolymeric molecule.

Examples of suitable R' radicals include any of the R radicals illustrated above, as well as alkenyl radicals such as vinyl, allyl, hexenyl and cyclohexenyl; and halogenated monovalent hydrocarbon radicals such as chlorophenyl, dichlorophenyl, bromophenyl, tetrapromoxenyl, tetrafluoroethyl, α,α,α-trifluorotolyl, chlorovinyl, and 1,1,1-trifluoropropyl radicals. As is usual with organosilicon compounds, those polymers and copolymers in which R and R' are methyl and/or phenyl radicals are preferred for their thermal stability. Thus when any R' substituted polymeric units are present it is preferred that they be of the formula

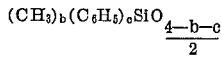

where $b$ is 0 to 3 inclusive, $c$ is 0 to 2 inclusive, the sum $b+c$ is not greater than 3, and the average value of the sum of $b+c$ is from 0.8 to 3 inclusive.

Copolymers of the type discussed above can be prepared by the cohydrolysis of any one or more of the monomers of this invention as mixed with one or more monomers of the formula $R'_bSiY_{4-b}$ where R', Y, and $b$ are as defined above. The latter are well-known materials, many of which are commercially available. The usual and well-known techniques of organosilicon cohydrolysis are applicable. It is to be understood that the defined siloxane polymers and copolymers of this invention can contain small amounts of unhydrolyzed Y radicals or uncondensed OH radicals attached to some of the silicon atoms therein, as is conventional with the vast majority of organosiloxane polymers.

The resinous, rubbery, or fluid nature of the polymers and copolymers herein will depend largely upon the average degree of substitution (i.e. the ratio of total organic groups to total silicon atoms), following much the usual pattern of organosiloxane polymers. The products are useful in the same applications as the well-known "silicone" fluids, resins, and rubbers, e.g. as potting and sealing compounds, electrical insulation, gasketing, impregnating varnishes, and the like; and if desired can be used in conjunction with the conventional fillers such as silica aerogel, fume silica, titania, crushed quartz, ferric oxide, zinc oxide, and asbestos or glass fibers. Rubbers can be prepared from the polymers and copolymers having an average degree of substitution of about 2.0 by the usual organosiloxane rubber compounding techniques.

The following examples are illustrative only. All parts are parts by weight.

Example 1

A mixture of 27 parts allyl vinylacetate and 1 part of a Pt/C catalyst (containing 2 percent platinum by weight) was heated to 100° C. and 47.25 parts Me₂HSiCl slowly added thereto. The heat of reaction maintained the temperature at about 100° C. throughout the addition. The reaction mass was filtered to remove the catalyst, and then distilled. The compound

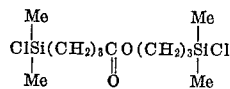

was obtained as a product, boiling at 127° C./2 mm. Hg, saponification equivalent 105.2 (calculated 105). When this compound is contacted with ethanol, alcoholysis takes place to produce the corresponding compound

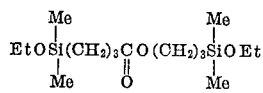

Example 2

When Me₂HSiBr is reacted with allyl vinylacetate in the manner of Example 1, the product is the corresponding bromosilane:

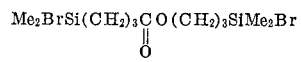

In like manner, the use of MeHSiCl₂ as the silane reactant produces

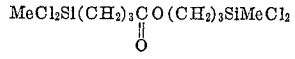

and the use of MePhHSiCl produces

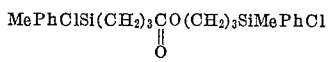

Example 3

When an equimolar mixture of HSiCl₃ and PhHSiCl₂ is used as the silane reactant in a reaction otherwise identical to that of Example 1, three products are obtained:

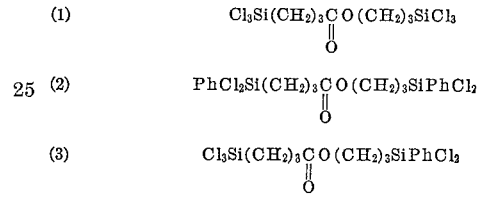

Example 4

When the chlorosilane product of Example 1 is mixed with an equal volume of toluene and the solution added to a ten-fold excess of the theoretical amount of water for hydrolysis, washing the hydrolyzate until it is free of residual HCl and distilling off the solvent produces a viscous organosiloxane polymer containing units of the formula

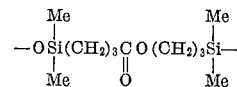

Such units, for simplicity, are conventionally represented in the organosiloxane polymer art as being of the formula

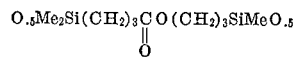

Example 5

A mixture of 46 parts (0.146 mole) of the chlorosilane product of Example 1 and 162.5 parts (1.5 moles) Me₃SiCl was cooled and agitated while a mixture of 10 parts ethanol and 150 parts water was added thereto. The resulting hydrolyzate was separated from the aqueous HCl layer and distilled. After removing the hexamethyldisiloxane formed from the excess Me₃SiCl, the tetrasiloxane

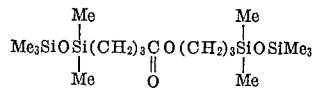

was obtained boiling at 125° C./3 mm. Hg, $n_D^{20}$ 1.4253, $d_4^{20}$ 0.9018, molar refraction 119.94 (calculated 120.63).

Example 6

When a mixture containing 1 mole each of the three chlorosilanes of Example 3, 1 mole Cl₂C₆H₃SiCl₃, 0.1 mole CH₂=CHSiCl₃, 0.8 mole (F₃CCH₂CH₂)MeSiCl₂ and 0.1 mole Si(OEt)₄ is mixed with an equal weight of toluene and added to an excess of water, the washed hydrolyzate is a toluene solution of a resinous copolymer containing 20 molar percent each of units of the formula $$O_{1.5}Si(CH_2)_3\underset{\underset{O}{\|}}{C}O(CH_2)_3SiO_{1.5}$$

$$OPhSi(CH_2)_3\underset{\underset{O}{\|}}{C}O(CH_2)_3SiPhO$$

$$O_{1.5}Si(CH_2)_3\underset{\underset{O}{\|}}{C}O(CH_2)_3SiPhO$$

and $Cl_2C_6H_3SiO_{1.5}$, with 16 molar percent $$(F_3CCH_2CH_2)MeSiO$$

2 molar percent $CH_2=CHSiO_{1.5}$ and 2 molar percent $SiO_2$ units.

*Example 7*

When a mixture of 0.8 mole of $$MeCl_2Si(CH_2)_3\underset{\underset{O}{\|}}{C}O(CH_2)_3SiMeCl_2$$

2 moles $MeSiCl_3$, 1 mole $PhSiCl_3$ and 0.2 mole $Ph_2SiCl_2$ is mixed with toluene and hydrolyzed as in Example 6, there is obtained a toluene solution of a resinous copolymer containing 20 molar percent of units of the formula $$OMeSi(CH_2)_3\underset{\underset{O}{\|}}{C}O(CH_2)_3SiMeO$$

40 molar percent $MeSiO_{1.5}$, 25 molar percent $PhSiO_{1.5}$, and 5 molar percent $Ph_2SiO$ units.

That which is claimed is:
1. A silylpropyl silylbutanoate selected from the group consisting of (1) monomeric silanes having the formula $$R_xY_{3-x}Si(CH_2)_3\underset{\underset{O}{\|}}{C}O(CH_2)_3SiR_xY_{3-x}$$

where R is a monovalent hydrocarbon radical free of aliphatic unsaturation, Y is selected from the group consisting of Cl, Br, and alkoxy radicals, and $x$ is an integer of from 0 to 2 inclusive, and (2) siloxanes containing polymeric units of the formula $$O_{\frac{3-x}{2}}R_xSi(CH_2)_3\underset{\underset{O}{\|}}{C}O(CH_2)_3SiR_xO_{\frac{3-x}{2}}$$

where R and $x$ are as above defined.
2. The silylpropyl silylbutanoate having the formula $$(CH_3)_2ClSi(CH_2)_3\underset{\underset{O}{\|}}{C}O(CH_2)_3Si(CH_3)_2Cl$$

3. The silylpropyl silylbutanoate having the formula $$CH_3Cl_2Si(CH_2)_3\underset{\underset{O}{\|}}{C}O(CH_2)_3SiCH_3Cl_2$$

4. The silylpropyl silylbutanoate having the formula $$(CH_3)(C_6H_5)ClSi(CH_2)_3\underset{\underset{O}{\|}}{C}O(CH_2)_3Si(CH_3)(C_6H_5)Cl$$

5. A copolymeric siloxane in which at least 0.1 molar percent of the polymeric units are of the formula $$O_{\frac{3-x}{2}}R_xSi(CH_2)_3\underset{\underset{O}{\|}}{C}O(CH_2)_3SiR_xO_{\frac{3-x}{2}}$$

where R is a monovalent hydrocarbon radical free of aliphatic unsaturation and $x$ is an integer of from 0 to 2 inclusive, the remaining polymeric units being of the formula $$R'_bSiO_{\frac{4-b}{2}}$$

where $b$ is an integer of from 0 to 3 inclusive and has an average value of from 0.8 to 3 inclusive, and R' is selected from the group consisting of monovalent hydrocarbon radicals and halogenated monovalent hydrocarbon radicals.

6. A copolymeric siloxane of the formula $$(CH_3)_3SiO\underset{\underset{CH_3}{|}}{\overset{\overset{CH_3}{|}}{Si}}(CH_2)_3\underset{\underset{O}{\|}}{C}O(CH_2)_3\underset{\underset{CH_3}{|}}{\overset{\overset{CH_3}{|}}{Si}}OSi(CH_3)_3$$

References Cited in the file of this patent

UNITED STATES PATENTS 2,637,738     Wagner _____ May 5, 1953

OTHER REFERENCES

"The Chemistry of Organic Compounds," pp. 92 and 97, 1934. (Photocopy enclosed herein.)

Witmore: Organic Chemistry, 1937 Edition, pp. 145, 312 and 349. (Copy in Scientific Library.)

Journal Chemistry Soc. (1948), p. 661. (Copy in Sci. Library.)

Bull. Soc. Chem. Belgium, vol. 38, pp. 133–145 (1929, abstracted in Chem. Abstracts, vol. 23, p. 4443 (1929)). (Copy in Scientific Library.)